No. 661,978. Patented Nov. 20, 1900.
G. E. HALL.
ROLLER RATCHET FOR PULLEYS, &c.
(Application filed Jan. 26, 1900.)
(No Model.)
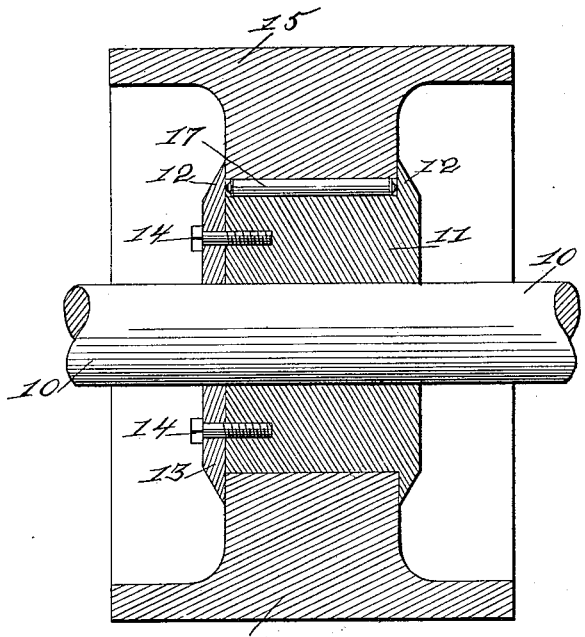
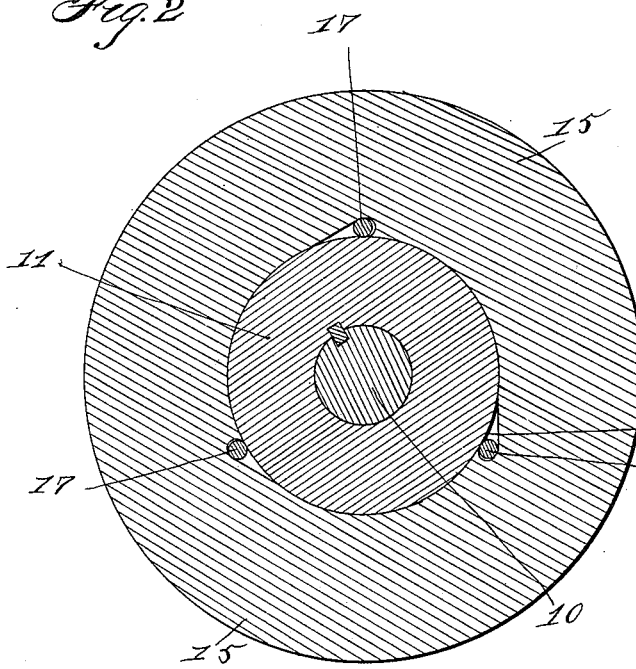
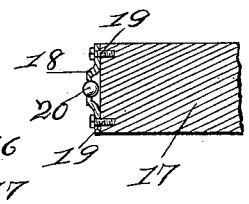
Witnesses
F. H. Stuart
Elva G. Wilcox
Inventor: George E. Hall
By J. Ralph Irving, Atty

UNITED STATES PATENT OFFICE.

GEORGE E. HALL, OF KANSAS CITY, MISSOURI.

ROLLER-RATCHET FOR PULLEYS, &c.

SPECIFICATION forming part of Letters Patent No. 661,978, dated November 20, 1900.

Application filed January 26, 1900. Serial No. 2,888. (No model.)

*To all whom it may concern:*

Be it known that I, GEORGE E. HALL, a citizen of the United States, residing at Kansas City, in the county of Jackson, State of Missouri, have invented certain new and useful Improvements in Roller-Ratchets for Pulleys, &c., of which the following is a specification.

The object of this invention is to provide a ratchet of this class of simple, strong, durable, and inexpensive construction and which may be readily assembled or taken apart for repair, replacement, &c., and which will operate with a minimum of friction.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a longitudinal sectional view of a pulley having my improved roller-ratchet device therein. Fig. 2 shows a transverse sectional view of the same. Fig. 3 shows an enlarged detail section illustrating the construction, arrangement, and combination with the ratchet-rollers of the bearing-balls at the ends thereof.

Referring to the accompanying drawings, I have used the reference-numerals 10 to indicate the shaft, to which a disk-shaped hub 11 is keyed. Formed integral with one end of the hub 11 is an outwardly-projecting flange 12, and detachably connected with the opposite end of the hub is a plate 13, secured to the hub proper by means of the screws 14 and having its edge projecting beyond the body portion of the hub to substantially the same distance as the flange or rim 12.

The reference-numeral 15 indicates the pulley-rim mounted upon the hub between the flange 12 and the plate 13, so as to be capable of free rotation upon the hub within said flange and plate. Formed on the inner surface of the rim 15 is a series of pockets 16. The outer surface of each pocket extends substantially tangentially from the hub on which the rim is mounted, and at the outer end of each pocket is a space large enough to admit a roller 17, cylindrical in shape and of a length slightly less than the length of the hub. On each end of each of said rollers 17 is a plate 18, connected to the roller by means of the screws 19 and having therein a bearing-ball 20, the surface of the ball projecting beyond the plate. These parts are so proportioned that the balls 20 on the opposite ends of the rollers will just clear the flange 12 and plate 13.

In practical use, and assuming that the parts were arranged as shown in the drawings, it is obvious that when the shaft moves in one direction the rollers 17 will be forced outwardly into the pockets 16, and hence the pulley-rim 15 will not be turned. When moving in this direction, it is obvious that if a slight lateral strain were applied to the pulley the bearing-balls on the ends of the rollers would engage with the flange 12 or plate 13, and hence prevent friction and wear on these parts. It is obvious in this connection that if the rollers themselves were allowed to engage the parts 12 and 13 or if the rim 15 engaged said parts considerable wear would take place and considerable power be lost by friction. However, by providing bearing-balls on the ends of these rollers this wear and friction is obviated. Furthermore, a considerable advantage is obtained by the use of this arrangement over the ordinary ball-bearings commonly used in such places in that the parts may be disconnected and balls cannot then readily be lost, as they are attached to the rollers, which are large enough to be readily seen. When, however, the shaft is rotated in an opposite direction, it is obvious that the rollers will be made to bind between the inclined surface of the pocket 16 and the outer surface of the hub, and hence the pulley-rim must be rotated in unison with the hub. Hence a ratchet device is provided of few parts and in which the wear is reduced to a minimum; and, furthermore, a device of this class is produced at comparatively slight cost, inasmuch as the pockets for the rollers may be cut on the interior of the rim from one end to the other thereof—that is, they may be cut on an ordinary planer.

Having thus described my invention, what I claim, and desire to secure by Letters Patent of the United States therefor, is—

1. An improved roller-ratchet for pulleys and the like, comprising in combination, a hub 11, having an integral flange 12, a plate 13 detachably connected with the opposite end of the hub, a rim mounted on said hub between the integral flange and said detachable plate, and having pockets 16 therein, extending entirely through the rim and rollers in said pockets, substantially as, and for the purposes stated.

2. An improved roller-ratchet device for pulleys and the like, comprising, in combination, a hub having on its ends projecting flanges, a pulley-rim or the like, mounted upon said hub between said flanges, there being pockets 16 in said rim, extending entirely through the rim, rollers in said pockets, ball-holders on the ends of the rollers, and bearing-balls in said holders, substantially as, and for the purposes stated.

GEORGE E. HALL.

Witnesses:
 THOMAS G. ORWIG,
 J. RALPH ORWIG.